(12) United States Patent
Ferren et al.

(10) Patent No.: US 7,962,740 B2
(45) Date of Patent: *Jun. 14, 2011

(54) METHOD AND APPARATUS FOR SYNCHRONIZING AUDIO AND VIDEO IN ENCRYPTED VIDEOCONFERENCES

(75) Inventors: Bran Ferren, Beverly Hills, CA (US); W. Daniel Hillis, Encino, CA (US); Gerard Roccanova, Huntington Beach, CA (US)

(73) Assignee: Applied Minds, Inc., Glendale, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/168,040

(22) Filed: Jul. 3, 2008

(65) Prior Publication Data

US 2008/0267401 A1     Oct. 30, 2008

Related U.S. Application Data

(62) Division of application No. 10/661,110, filed on Sep. 12, 2003, now Pat. No. 7,464,262.

(51) Int. Cl.
*H04L 9/00* (2006.01)
*H04K 1/00* (2006.01)
*H04N 7/14* (2006.01)

(52) U.S. Cl. ............... 713/150; 380/217; 348/14.08; 348/14.13

(58) Field of Classification Search .................. None
See application file for complete search history.

(56) References Cited

U.S. PATENT DOCUMENTS

| | | | |
|---|---|---|---|
| 4,768,190 A * | 8/1988 | Giancarlo .............. 370/400 |
| 5,841,763 A | 11/1998 | Leondires et al. |
| 5,867,494 A * | 2/1999 | Krishnaswamy et al. ..... 370/352 |
| 5,886,734 A | 3/1999 | Ozone et al. |
| 5,936,662 A | 8/1999 | Kim et al. |
| 5,999,525 A * | 12/1999 | Krishnaswamy et al. ..... 370/352 |
| 6,262,978 B1 * | 7/2001 | Bruno et al. .............. 370/260 |
| 6,335,927 B1 * | 1/2002 | Elliott et al. .............. 370/352 |
| 6,442,758 B1 * | 8/2002 | Jang et al. .............. 725/119 |
| 6,717,607 B1 | 4/2004 | Lauper et al. |
| 6,728,221 B1 * | 4/2004 | Shaffer et al. ............ 370/260 |
| 6,731,625 B1 * | 5/2004 | Eastep et al. ............. 370/352 |
| 6,754,181 B1 * | 6/2004 | Elliott et al. ............. 370/252 |
| 6,851,053 B1 | 2/2005 | Liles et al. |
| 6,909,708 B1 * | 6/2005 | Krishnaswamy et al. ..... 370/352 |
| 6,989,856 B2 * | 1/2006 | Firestone et al. .......... 348/14.09 |
| 7,046,779 B2 | 5/2006 | Hesse |
| 7,145,898 B1 * | 12/2006 | Elliott .................... 370/352 |
| 7,180,535 B2 | 2/2007 | Ahonen |
| 7,362,349 B2 * | 4/2008 | Nelson et al. ........... 348/14.08 |
| 7,464,262 B2 * | 12/2008 | Ferren et al. ............. 713/150 |
| 7,471,648 B2 * | 12/2008 | Andersen et al. ......... 370/261 |

(Continued)

Primary Examiner — Christopher A Revak
(74) Attorney, Agent, or Firm — Michael A. Glenn; Glenn Patent Group

(57) ABSTRACT

The invention provides a system that preserves the synchronization of the audio and video presented at a secure conferencing site without necessitating decryption, decompression, compression, and encryption of signals at the hub. The presently preferred embodiment of the invention provides an apparatus and method for synchronizing audio and video in encrypted videoconferences that comprises a plurality of conference sites; and a hub for receiving a compressed and encrypted, composite audio and video signal from each site, for determining a currently active site, and for transmitting said composite audio and video signal from said currently active site to all other sites; said hub receiving a compressed and encrypted audio only signal from each site; wherein said hub routes all incoming compressed and encrypted audio only signals to each site.

11 Claims, 2 Drawing Sheets

U.S. PATENT DOCUMENTS

| | | | |
|---|---|---|---|
| 7,570,607 B2 * | 8/2009 | Andersen et al. | 370/261 |
| 2002/0064149 A1 * | 5/2002 | Elliott et al. | 370/352 |
| 2002/0093531 A1 * | 7/2002 | Barile | 345/753 |
| 2003/0174826 A1 * | 9/2003 | Hesse | 379/210.01 |
| 2004/0008249 A1 * | 1/2004 | Nelson et al. | 348/14.09 |
| 2004/0008635 A1 * | 1/2004 | Nelson et al. | 370/260 |
| 2005/0078170 A1 * | 4/2005 | Firestone et al. | 348/14.08 |
| 2005/0084086 A1 * | 4/2005 | Hesse | 379/202.01 |
| 2006/0244818 A1 * | 11/2006 | Majors et al. | 348/14.08 |
| 2007/0285504 A1 * | 12/2007 | Hesse | 348/14.08 |
| 2008/0002672 A1 * | 1/2008 | Lin | 370/352 |
| 2009/0109959 A1 * | 4/2009 | Elliott et al. | 370/352 |
| 2010/0118113 A1 * | 5/2010 | Cook | 348/14.09 |

* cited by examiner

METHOD AND APPARATUS FOR SYNCHRONIZING AUDIO AND VIDEO IN ENCRYPTED VIDEOCONFERENCES

CROSS-REFERENCE TO RELATED APPLICATIONS

This Application is a divisional application of U.S. patent application Ser. No. 10/661,110, filed Sep. 12, 2003, now U.S. Pat. No. 7,464,262, the entirety of which is incorporated herein by this reference thereto.

BACKGROUND OF THE INVENTION

1. Technical Field

The invention relates to videoconferencing systems. More particularly, the invention relates to a method and apparatus for synchronizing audio and video in encrypted videoconferences.

2. Description of the Prior Art

In many video conferencing systems, it is possible to conduct a conference involving more than two conference sites. In such conferences, the network topology often incorporates a hub that receives incoming audio and video signals from each of the participating sites, and routes appropriate outgoing audio and video signals to each site. Because each site typically has a single display on which to present video signals routed from the hub, a single video signal is routed from the hub to each site to conserve bandwidth. However, unlike video, audio for more than one site may be presented simultaneously at a given site, and indeed conference participants at a given site viewing a single video signal may still benefit from hearing audio originating from all conference sites.

Existing systems meet this need by mixing audio signals and selecting video signals at the hub. All audio signals received at the hub are mixed together and routed to each site. However, only the video signal that a particular site is to display is routed to that particular site. The audio mixing and video selection operations are sufficiently simple that the latencies introduced into the audio and video signals are comparable. The audio and video presented at the destination site are therefore synchronized.

In the case of a video conferencing system incorporating encryption, several challenges are encountered. If the standard approach is to be used, the video and audio signals must be decrypted and decompressed prior to audio mixing and video selection. This leads to a substantial increase in latency. Further, it requires that the physical site housing the hub be secured and authorized to handle unencrypted information.

An alternative approach involves sending the audio signal received from each site to each other site. However, in this approach each site must then decrypt and decompress the audio and video signals separately. Most notably, the audio signal originating from the same site as the displayed video is handled separately from the displayed video. The discrepancy in latencies that results produces a desynchronization of the audio associated with the displayed video. The result is a confusing, distracting, and unsatisfying experience for the conference participants.

It would be advantageous to provide a system that preserves the synchronization of the audio and video presented at a secure conferencing site without necessitating decryption, decompression, compression, and encryption of signals at the hub.

SUMMARY OF THE INVENTION

The invention provides a system that preserves the synchronization of the audio and video presented at a secure conferencing site without necessitating decryption, decompression, compression, and encryption of signals at the hub. The presently preferred embodiment of the invention provides an apparatus and method for synchronizing audio and video in encrypted videoconferences that comprises a plurality of conference sites; and a hub for receiving a compressed and encrypted composite audio and video signal from each site, determining for each conference site a currently displayed composite audio and video signal, and transmitting each currently displayed composite audio and video signal to each respective site; said hub receiving a compressed and encrypted audio only signal from each site; wherein said hub routes all incoming compressed and encrypted audio only signals to each site. The invention further comprises an audio deselection and mixing device located at each conference site that deselects the audio only signal corresponding to the currently displayed composite audio and video signal and mixes all other audio only signals with the audio signal within the currently displayed composite audio and video signal.

DETAILED DESCRIPTION OF THE INVENTION

The invention provides a system that preserves the synchronization of the audio and video presented at a secure conferencing site without necessitating decryption, decompression, compression, and encryption of signals at the hub.

Figure 1:
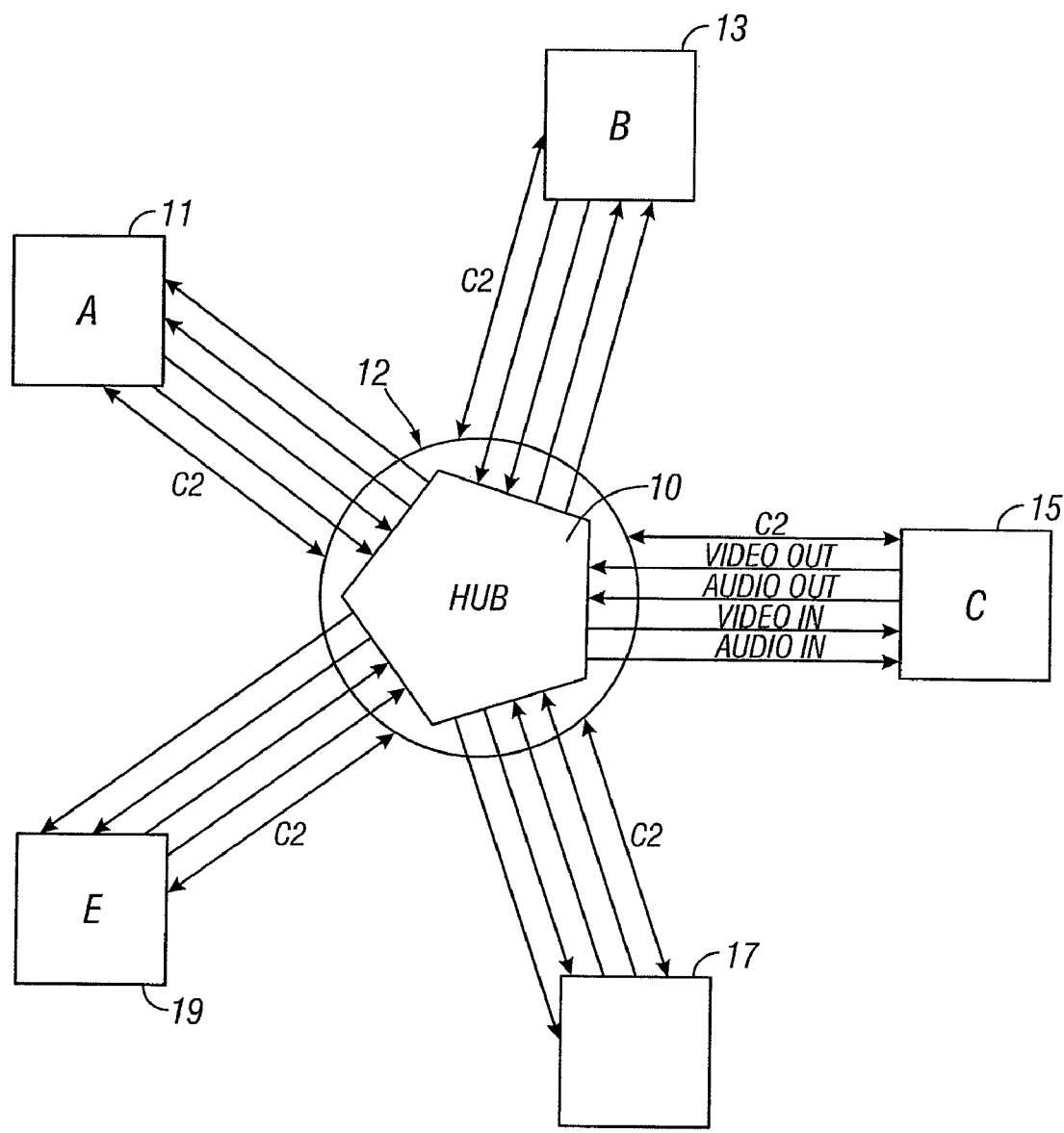
FIG. 1 is a block schematic diagram showing a system that implements a method and apparatus for synchronizing audio and video in encrypted videoconferences according to the invention.

FIG. 1 is a block schematic diagram showing a system that implements a method and apparatus for synchronizing audio and video in encrypted videoconferences according to the invention. In the preferred embodiment of the herein disclosed conferencing system, each of sites A-E, 11, 13, 15, 17, and 19, respectively, sends to the hub 10 a compressed and encrypted, composite audio and video signal. For each of the sites, the hub determines a currently displayed composite audio and video signal, based upon conference control information, and sends this composite audio and video signal to each respective site without decompressing or decrypting the signal. There is no global active site. Instead, it is unique to each site. Thus, each site gets its own currently displayed composite signal.

Each site also sends to the hub a compressed and encrypted audio only signal. It should be noted that the audio only signal sent from each site may in fact be a mixed audio signal composed of audio obtained from several microphones at a single conferencing site. The hub routes all of the incoming compressed and encrypted audio only signals to each site.

Figure 2A:
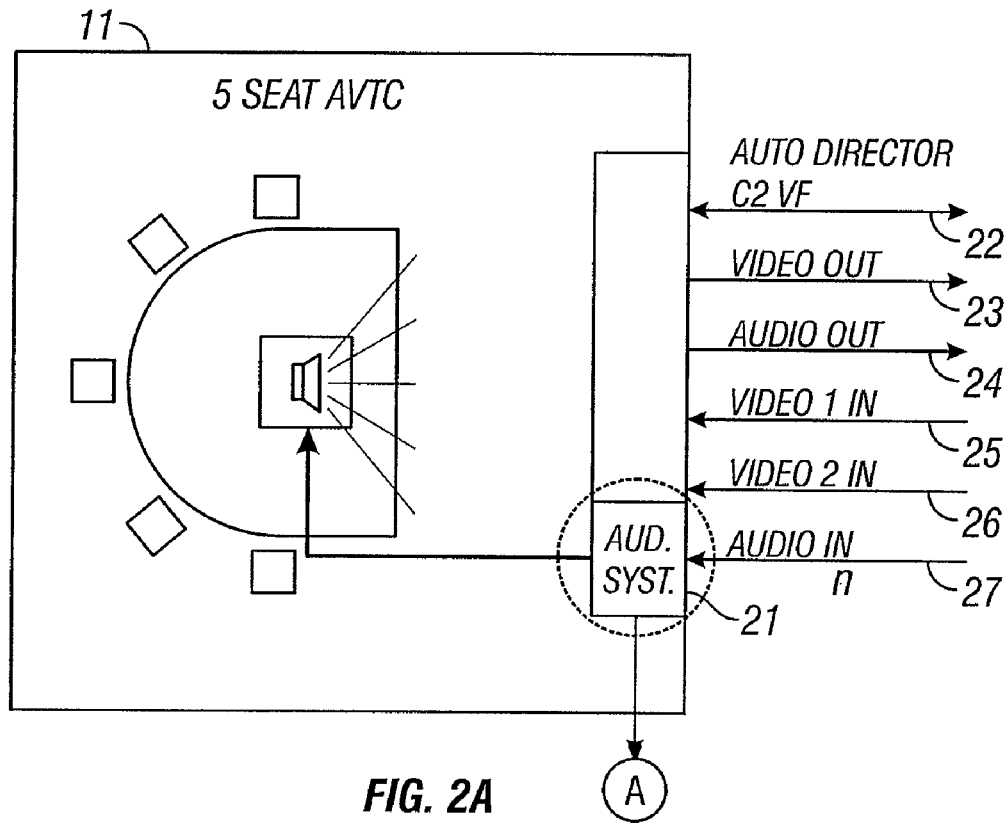
FIG. 2 is a block schematic diagram showing a video conference location that operates in connection with a method and apparatus for synchronizing audio and video in encrypted videoconferences according to the invention.

FIG. 2 is a block schematic diagram showing a video conference location that operates in connection with a method and apparatus for synchronizing audio and video in encrypted videoconferences according to the invention. Each site, such as the five seat audio-video teleconference center 11 shown in FIG. 2a, decrypts, decompresses, and then displays the video within the composite audio and video signal received from the hub. The actual technique used for encryption/decryption and compression/decompression is a matter of choice to the person skilled in the art and is, therefore, not discussed in detail herein.

The signals transmitted to and from each site typically comprise conference control signals 22 to coordinate feeds and switching via an out-of-band mechanism such as an intranet or the Internet; a locally selected compressed and encrypted composite audio and video output 23; a compressed and encrypted audio only output preferably obtained by mixing several microphone feeds obtained at the site 24; a compressed and encrypted primary view composite audio and video input 25 selected by the hub control; a compressed and encrypted secondary view composite audio and video input 26 selected by the hub control for split screen generation (see the discussion below); and n lines of compressed and encrypted audio only inputs 27 which correspond to each site in the conference.

Figure 2B:
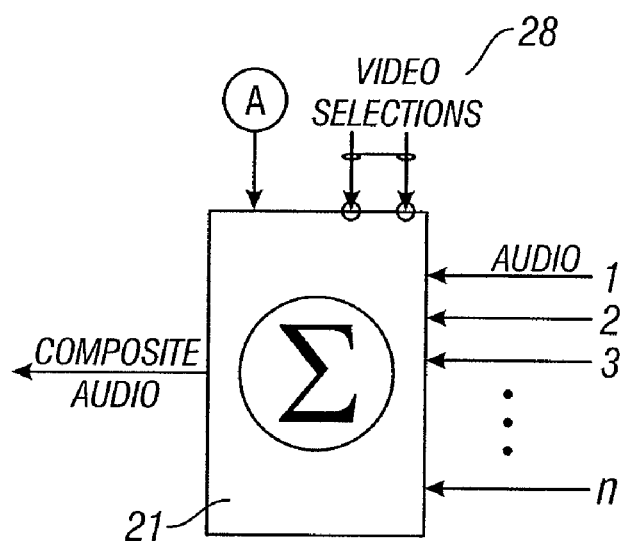

The audio from the composite audio and video input signal, together with the other, separately decrypted and decompressed audio only input signals, is passed to an audio deselection and mixing device 21 (FIG. 2b). The separate audio only signal corresponding to the audio signal within the composite audio and video input signal is deselected by the device using a logic control signal 28 generated by an executive controller 12 (see FIG. 1). The logic control signal is shown in FIG. 1 as an out-of-band signal C2 generated by the executive controller, i.e. the hub controller, based upon video selection signals within the system. See Table 1 below, which details this exemplary audio selection logic scheme. Note that Table 1 shows the audio from the composite audio and video signal for the sending room in an upper cell of each receiving room row and the combined audio only signals from which the sending room audio has been subtracted in a lower cell of each receiving room row. For example, the rows for receiving room A intersects a column for sending room B in which the audio from the composite audio and video signals for sending room B is shown in an upper cell and the combined audio only signal from which the audio for room B has been subtracted, i.e. rooms CDE, shown in a lower cell. Those skilled in the art will appreciate that any known technique may be used for the audio deselection process.

The other audio signals, including the audio from within the composite signal, are mixed together and reproduced at the conferencing site. This process ensures that each audio signal is reproduced only once. Because the audio and video within the composite audio and video signal are transmitted, decrypted, and decompressed together, the latencies introduced into the signals are well matched.

TABLE 1

Audio Selection Logic

|  |  | SENDING ROOM | | | | |
|---|---|---|---|---|---|---|
|  |  | A | B | C | D | E |
| RECEIVING ROOM | A | — | B | C | D | E |
|  |  | — | CDE | BDE | BCE | BCD |
|  | B | A | — | C | D | F |
|  |  | CDE | — | ADE | ACE | ACD |
|  | C | A | B | — | D | E |
|  |  | BDE | ADE | — | ABE | ABD |
|  | D | A | B | C | — | E |
|  |  | BCE | ACE | ABE | — | ABC |
|  | E | A | B | C | D | — |
|  |  | BCD | ACD | ABD | ABC | — |

The audio associated with the displayed video is therefore synchronized with the displayed video. Because the audio signals transmitted separately are processed separately, a latency different from that of the composite signal may be introduced. However, because these audio signals are not associated with the video displayed, this discrepancy is not noticeable to the participants. Nonetheless, the audio deselection device may be equipped with delay circuitry to attempt to better align the separate audio signals with the composite signal.

If a split screen display is to be presented at a site, the hub transmits two composite audio and video signals to the site. Following decryption and decompression of the composite signals, the site uses a split screen composition processor to compose the split screen display from two video signals. In this case, two audio signals are deselected using the audio deselection device 21.

The audio deselection hub may also be used to deselect those audio signals not directly associated with the ongoing conversation. This may help in reducing the sense of background noise and audio clutter often observed during conferences where several audio signals are mixed.

Although the invention is described herein with reference to the preferred embodiment, one skilled in the art will readily appreciate that other applications may be substituted for those set forth herein without departing from the spirit and scope of the invention.

Notably, while the invention is describe with respect to a secure conferencing system incorporating both compression and encryption, the invention is also useful in conferencing systems incorporating only encryption, only compression, and neither encryption nor compression. In systems incorporating only encryption, the invention obviates the need for securing the conference hub. In systems incorporating only compression, the invention reduces the total system latency. In systems incorporating neither encryption nor compression, the invention ensures optimal synchronization of audio and video signals.

Accordingly, the invention should only be limited by the Claims included below.

The invention claimed is:

1. An apparatus for synchronizing audio and video in videoconferences, comprising:
   a plurality of conference sites; and
   a hub for receiving a composite audio and video signal from each site, determining for each site a currently displayed composite audio and video signal, and transmitting said currently displayed composite audio and video signal to each of said sites;
   said hub receiving an audio only signal, separate from said received composite audio and video signal, from each site; and
   wherein said hub routes all incoming received audio only signals to each site separately from said transmitted composite audio and video signal;
   each site comprising:
      an audio deselection and mixing device for deselecting an audio only signal corresponding to an audio portion of said currently displayed composite audio and video signal, and for mixing said audio portion of said composite audio and video signal for said currently active site with all other audio only signals at said site;
      wherein audio associated with displayed video is synchronized with said displayed video.

2. The apparatus of claim 1, wherein said audio only signal for a site comprises:
   a mixed audio signal composed of audio obtained from several microphones at said site.

3. The apparatus of claim 1, wherein said composite audio and video signals are encrypted.

4. The apparatus of claim 1, wherein said composite audio and video signals are compressed.

5. The apparatus of claim 1, wherein said composite audio and video signals are both encrypted and compressed.

6. The apparatus of claim 5, each site comprising:
 a decoder for decrypting and decompressing video within said currently displayed composite audio and video signal.

7. The apparatus of claim 1, wherein said audio only signal from each site is encrypted and compressed, each site comprising:
 a decoder for decrypting and decompressing said compressed and encrypted audio only signal from each site.

8. The apparatus of claim 1, said audio deselection and mixing device further comprising:
 delay circuitry for aligning said audio only signals with said composite audio and video signal.

9. The apparatus of claim 1, wherein said hub transmits at least two composite audio and video signals to each site to provide a split screen display at each site.

10. The apparatus of claim 9, wherein those of said audio only signals which correspond to said at least two composite audio and video signals are deselected at each said site.

11. The apparatus of claim 1, further comprising:
 an audio deselection hub for deselecting those audio only signals not directly associated with an ongoing conversation.

* * * * *